Figure 1:
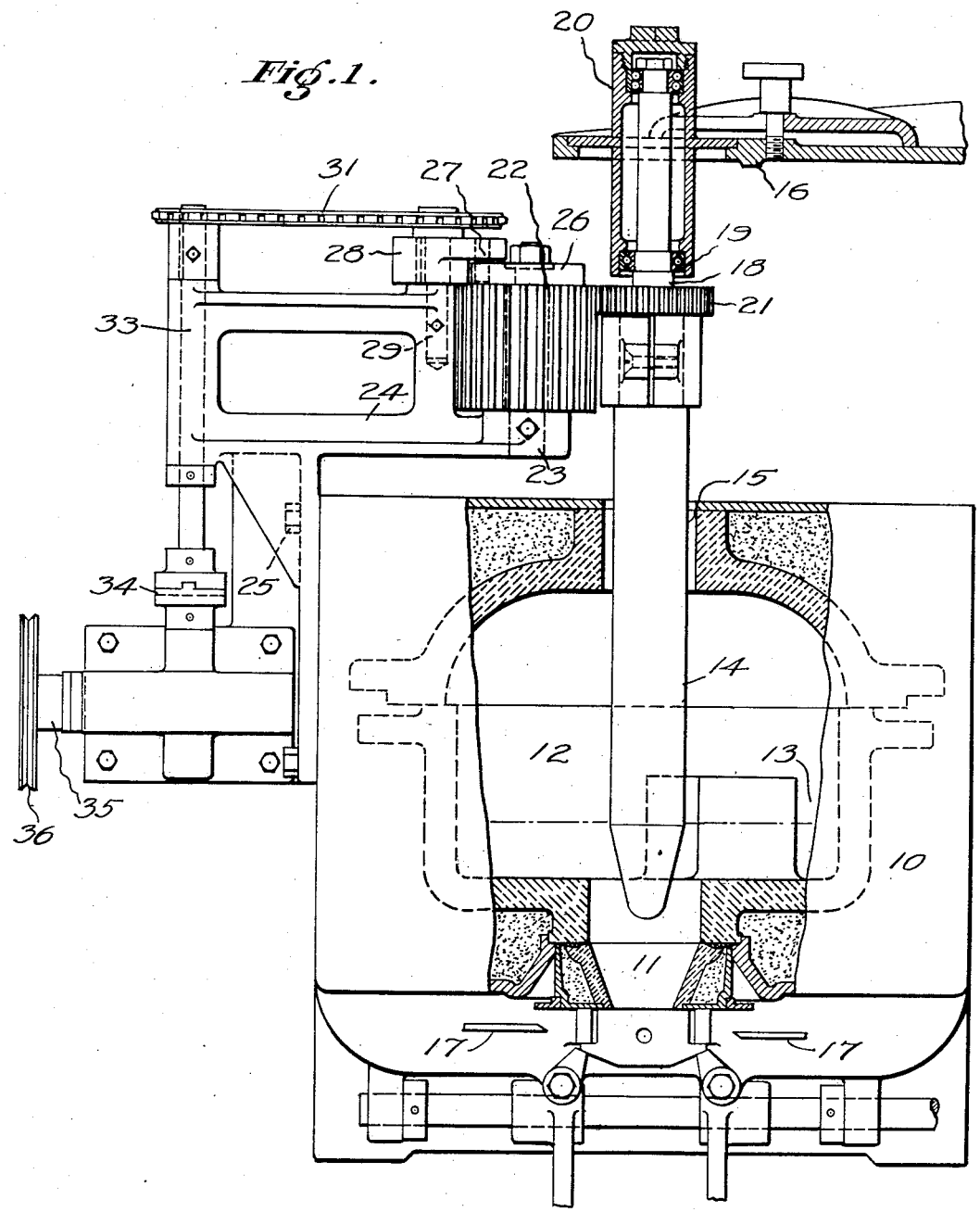

Oct. 20, 1931.  E. O. HILLER  1,828,226
METHOD AND APPARATUS FOR FEEDING GLASS CHARGES OF DIFFERENT COLORS
Filed Oct. 15, 1927  2 Sheets-Sheet 1

Witness.
A. C. Kaiser.

Inventor:
Everett O. Hiller.
by Robson D Brown
Attorney.

Oct. 20, 1931.　　　　E. O. HILLER　　　　1,828,226
METHOD AND APPARATUS FOR FEEDING GLASS CHARGES OF DIFFERENT COLORS
Filed Oct. 15, 1927　　2 Sheets-Sheet 2
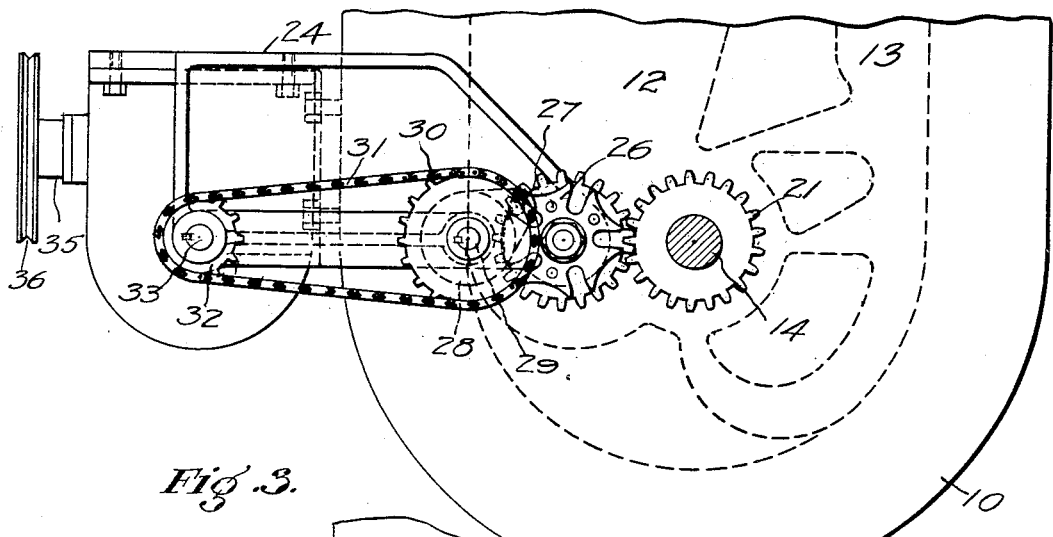
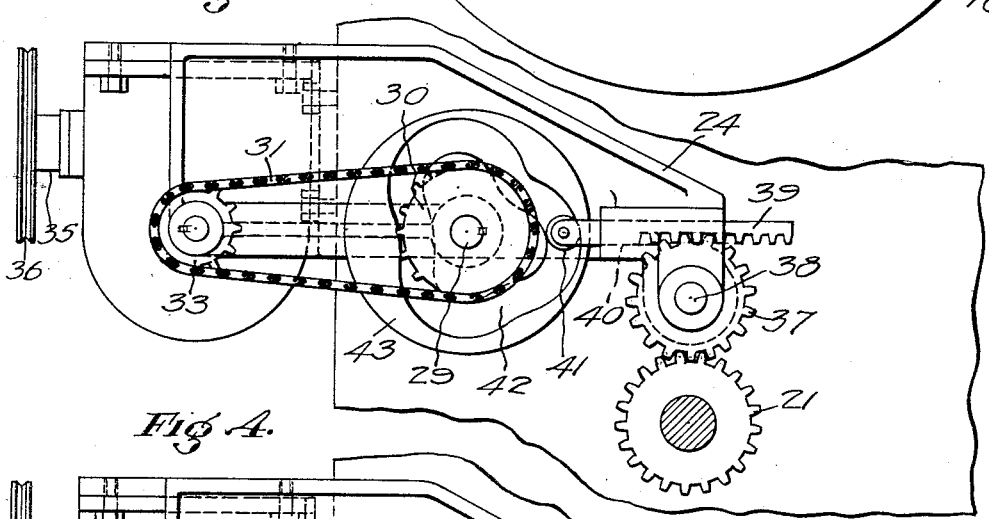
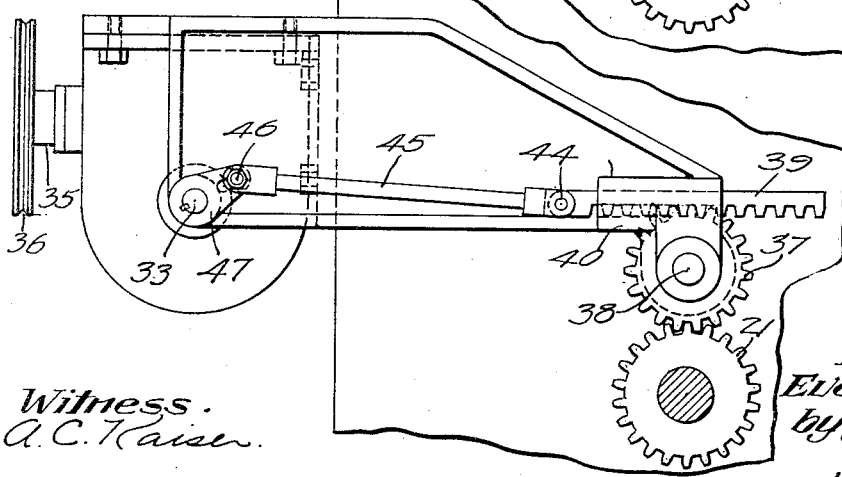
Witness.
A. C. Kaiser.
Inventor:
Everett O. Hiller,
by Roland Brown
Attorney.

Patented Oct. 20, 1931

1,828,226

UNITED STATES PATENT OFFICE

EVERETT O. HILLER, OF HARTFORD, CONNECTICUT, ASSIGNOR TO HARTFORD-EMPIRE COMPANY, OF HARTFORD, CONNECTICUT, A CORPORATION OF DELAWARE

METHOD AND APPARATUS FOR FEEDING GLASS CHARGES OF DIFFERENT COLORS

Application filed October 15, 1927. Serial No. 226,322.

My invention relates to apparatus for and methods of feeding molten glass and is particularly adapted for use in the manufacture of toy marbles or other objects wherein glass of several different colors are embodied.

In the manufacture of marbles, for example, it is the practice to imitate as closely as possible the color effects of agate and to that end it has been the practice to supply the marble forming machine with charges made up of glass of two or more colors so collected as to provide a basic color having streaks or striæ of other colors therethrough, it being desired that the streaks be more or less irregular and to thus more closely imitate the natural coloring of the agate. Prior to my invention, it has been customary to feed glass for this purpose by hand, the gatherer collecting on his punty portions of each gather from two or more supplies of different colored glass. It is the purpose of my invention to provide means and methods by which glass of several different colors or kinds may be automatically mixed in a manner desirable for the production of glass marbles and automatically fed to the forming machine in charges of proper size, shape and viscosity and with uniformity in weight and shape but non-uniformity in distribution of color between successive charges.

It has, in the past, been the practice to feed glass for the manufacture of articles, such as bottles, from a single kind or color of glass by the use of automatic feeding mechanism, such, for instance, as the Hartford-Empire single feeder, which is illustrated and described in British Patent No. 227,078, accepted August 27, 1925. It has been proposed to so handle and mix glass of this character by the operations of such feeders, as to improve the homogeneity and temperature conditions thereof, and to that end it has been proposed to use a rotating member such as a tube or a plunger in the forehearth of the feeder at or near the outlet thereof to intimately mix the glass delivered by the feeder prior to its passage through the outlet. These rotating or stirring means have been proposed for the purpose and to the end that the various striæ of the same type of glass in the forehearth be so intimately mixed as to prevent inequalities of temperature and viscosity of different axial portions of the mold charges delivered therefrom. My novel method and the means employed to accomplish it are not provided for the purpose of so mixing the glass, but are specifically for the purpose of winding several different kinds of glass together to provide streaks of colors throughout the mold charge, and though I make use of certain fundamental structures of the prior art, this structure has been by me so modified and is so used as to attain this very different and valuable result.

Other specific objects of my invention will appear from the following specification and appended claims.

Apparatus suitable for the practice of my method is illustrated in the appended drawings, of which Figure 1 is a front view partly in section of a glass feeding apparatus provided with an implement for controlling the flow of glass through an outlet in the bottom of a glass container and with means for intermittently rotating the implement in a manner and to an extent desirable in the production of colored glass for marbles; and Figs. 2, 3 and 4 are plan views showing alternative means and methods of governing the rotation of the stirring implement, by means of which a great variety of effects, desirable in the manufacture of marbles, may be attained.

Generally speaking, in the practice of my invention I make use of a well known suspended charge feeder, such, for instance, as the aforesaid Hartford-Empire single feeder. This feeder has a container for receiving molten glass from a source of supply and is provided with an orifice in the bottom thereof constantly submerged by the glass. Mounted in axial alignment with the orifice is a refractory plunger mounted and driven to reciprocate toward and from the outlet to control discharge of the glass through the orifice. As generally used, the said single feeder also comprises a tubular member surrounding but spaced from the reciprocating plunger, which is adjustable toward and from a curb concentric with the upper portion of the orifice for accurately controlling the weights of the charges fed by the feeder.

In the practice of my method, I may dispense with the use of this tube or I may retain it as desired. The feeder illustrated in Fig. 1 hereof is similar to the Hartford-Empire single feeder referred to, but dispenses with the use of the aforesaid tube. I have provided means for rotating the controlling plunger in various ways suitable for the practice of my method in the manufacture of marbles and similar articles.

Referring now to the drawings, 10 is the container for molten glass connected to two sources of glass supply, not shown, and having a discharge opening in its bottom 11. The space above the outlet is in communication with a plurality of channels, such as 12, 13, through which glasses of different colors are brought to it above the outlet and within the control of a reciprocating and rotating plunger 14. The plunger 14 projects through an opening 15 in the upper portion of the container 10 and is mounted in axial alignment with the orifice 11. The plunger and its mechanism is suitably carried by an arm 16 which is adapted to reciprocate the plunger toward and from the outlet by means, not shown, but which may be of any well known type, such as, for instance, that included in the aforesaid Hartford-Empire single feeder and above referred to. The feeder is preferably provided with adjustments such as are included in the Hartford-Empire single feeder whereby the length of stroke of the plunger, the position of its stroke and the time of operation of the plunger with respect to the operation of a pair of shears, diagrammatically shown at 17, may be varied. The shears may be of any suitable and well known type, such, for instance, as those included in the Hartford-Empire single feeder and shown in the aforesaid British patent, and may be operated periodically in timed relation to the operation of the plunger to periodically sever charges of glass formed at and suspended from the outlet. The plunger 14 is carried by a shaft 18 mounted in ball bearings 19 in a housing 20, the housing being suitably mounted upon the reciprocating arm 16. The shaft 18 carries a gear 21 adapted to mesh with the gear 22. The gear 22 is mounted on a shaft 23 mounted in bearings, not shown, in a bracket 24 suitably fastened as by bolts 25 to the casing of the glass container. The gear 22 is of such length as to permit constant engagement thereof with the gear 21 at all points in the reciprocation of the plunger 14 and the housing 20. The gear 22 is rotated to effect the rotation and hence the mixing action, of the plunger 14 by suitable mechanism as, for instance, one of those shown in Figs. 2, 3 and 4.

As shown in Fig. 2, the shaft 23 carries a disk 26 of a Geneva drive cooperating with a driving pin 27 on the crank 28 mounted on the stud shaft 29. Also mounted on the shaft 29 and keyed to the crank 28 is a sprocket 30 carrying a chain 31 which is also carried by a sprocket 32 keyed to a shaft 33 mounted in bearings in the bracket 24 and connected through a clutch 34, Fig. 1, and gearings, not shown, to a drive shaft 35. The shaft 35 carries a pulley 36 driven from an electric motor or other source of power in synchronism with the reciprocations of the plunger and the operations of the shears. By means of this arrangement, intermittent accelerating and decelerating rotary movement is given to the gear 22 and hence to the plunger 14. By a suitable selection of gear ratios, the plunger may be rotated intermittently at any selected times and to any selected extent. It may, for example, be rotated completely once during each of its descending movements and permitted not to rotate during its ascending movement, or vice versa, or it may be turned through any portion of a complete rotation during each reciprocation thereof, or may be turned a plurality of times during each reciprocation, or it may be alternately rotated through a plurality of reciprocations and not rotated through a similar or different number of reciprocations.

By the mechanism shown in Fig. 3, means are provided to rotate the plunger first in one direction and then in the other. By suitably selecting the cam there shown and the gear ratios, an infinite variety of rotational characteristics may be given to the plunger, and hence a variety of effects in the mixing of the glasses may be obtained. The structure shown in Fig. 3 comprises a gear 37 suitably mounted on a shaft 38 carried by an extension of the bracket 24 and meshing with the gear 21 and with a rack 39. The rack 39 slides in guideways 40 and carries at its inner end a cam roll 41 adapted to ride in the closed cam path 42 of the cam 43. The cam 43 may be mounted on the shaft 29 and is driven, as in the structure of Fig. 2, through the sprockets 30, 33 and chain 31.

Another arrangement of mechanism for rotating the plunger is shown in Fig. 4 wherein gear 21 on the plunger meshes with a gear 37 mounted on the shaft 38. The gear 37 also meshes with the rack bar 39 mounted in the guides 40 and having at its inner end a link connection at 44 with a link 45 which, in turn, is pivoted as at 46 upon a crank 47 keyed to the shaft 33. By the use of the structure shown in Fig. 4 the plunger may be rotated first in one direction and then in the other, its speed of rotation alternately accelerating and decelerating during each of the movements. As in the other cases described, the gear ratios may be so selected that the plunger may be given various rotary movements relative to its reciprocating movement. For instance, it may be completely rotated in one direction during one or more reciprocations of the plunger and in the reverse direction during a succeeding number of reciprocations.

In operation, in the manufacture of toy marbles, it is desirable that the color effects in successive marbles be varied, and this is readily accomplished by the use of the mechanism above described. The glass flows constantly in a plurality of streams from the points of supply through separate channels to the area above the outlet 11 and thence proceeds by gravity to and through the outlet. As the glass begins to issue the plunger moves downwardly, accelerating the discharge and then moves upwardly retarding or reversing the flow of glass. The shears cut either while the plunger is in its lowest position or as it commences to rise. The glass so issuing is suspended from the outlet and is severed while freely suspended. It then falls freely through air to the shaping machine or onto a suitable trough, (not shown), down which it slides to the shaping machine. The lower end of the plunger is always immersed in the glass and is in adhesive contact therewith so that the rotation of the plunger imparts to the glass arriving in the several streams a twisting and intermingling action by which the desired color effects are obtained in the finished article. As heretofore stated, it is not desirable to so rotate the plunger as to thoroughly mix the several glasses, as such mixing would cause a blending of the colors and destroy the effects desired in the finished article.

The characteristics of a rotational movement of the plunger are to be selected with particular reference to the temperature, viscosity and color characteristics of the several glasses used in a particular feeding operation, and obviously no hard and fast rule is to be laid down as to these characteristics, as the coloring effects desired in any particular batch of marbles depends largely upon the taste of the manufacturer or his customer. With a particular selection of glass, a large number of desirable effects may be obtained in the finished article by the use of the apparatus described by me, which effects, while differing among themselves, are all within the spirit of my invention which, in its broader conception, comprises the method of automatically imparting to glass charges automatically formed from a plurality of colored glasses, a desirable and artistic incomplete mixing of these colors, and the accomplishment of this end through the use of an intermittently rotated reciprocating plunger coacting with a supply of the several glasses submerging the outlet of a container.

Desirable results may be obtained by any of the following operations, among numerous others (1) by the partial uni-directional rotation of the plunger during each reciprocating movement, (2) the partial duo-directional rotation of the plunger during each of its reciprocations, (3) the cyclic variation of the character of the rotational movement during one or more reciprocations of the plunger, (4) either uni-directional or duo-directional rotation of the plunger during a given number of reciprocations and the cessation of rotation through the same or a different number of reciprocations of the plunger.

If desired, a tube such as that included in the Hartford-Empire single feeder and shown in the aforesaid British patent may be used, and intermittent rotation may be imparted thereto by the means such as are herein shown for rotating the plunger.

I do not claim the specific arrangement of the forehearth nor the arrangement of the channels or the means shown for conducting the several colored glasses to the area above the feeder outlet, as this arrangement is the invention of another.

Having fully described my invention, what I claim is:

1. The method of automatically feeding mold charges of glass from a plurality of glasses of different colors, which comprises imparting rotary movement to converging streams of glass of different colors and mixing the glasses to a point short of blending, delivering the resultant glass in suspended masses below a severing plane, and severing charges therefrom.

2. The method of feeding molten glass in charges, each comprising glasses of two or more different colors, which comprises passing separate streams of glass to a common point above a submerged outlet in a container, stirring the glasses at such point to an extent short of causing the colors to blend, discharging the resultant glass downwardly and suspending it in successive masses below a severing plane, and periodically severing charges therefrom.

3. The method of feeding charges of molten glass, each of which contains glasses of different colors, which comprises passing the glasses from several distinct sources into a container and initially together above a downwardly opening discharge outlet and thence down and around an implement in adhesive contact therewith, stirring the glasses thus brought together by rotational movement imparted thereto by the implement, controlling the discharge of the resultant glass through the outlet by the downward and upward movements of said implement, and severing mold charges from the glass so discharged.

4. The method of feeding molten glass of different colors in charges, which comprises bringing streams of differently colored glass together at a common point and imparting periodically varying rotational movement thereto to wind the streams together, and delivering the resultant glass downwardly prior to a complete blending of the several colors.

5. The method of feeding glass in mold charges suitable for the manufacture of toy marbles, which comprises passing a plurality of streams of glass of different colors to a common point above a downwardly opening discharge outlet and into adhesive contact with a discharge controlling implement, controlling the discharge of successive masses of glass, rotating the implement to wind the streams together, varying in a given cycle the characteristics of the rotational movement imparted thereto during the formation of the several masses, and repeating the cycle.

6. The method of feeding mold charges suitable for the manufacture of glass marbles, which comprises passing a plurality of streams of glass of different colors to a common point above a discharge outlet and into adhesive contact with a discharge controlling implement, intermittently rotating the implement to mix the streams of glass to an extent short of causing the colors to blend and within a given cycle, varying the character of the rotational movement of the implement to vary the color effects in the glass in successive charges, reciprocating the implement to control the discharge of glass through the outlet, suspending the glass beneath the outlet, and severing charges therefrom.

7. Apparatus for feeding mold charges composed of glass of different colors, which comprises a container for the glass having a submerged outlet, a plurality of sources of supply of glasses of different colors, means for conducting streams of glass from said different sources initially together at a point above the outlet in the container, a plunger mounted for vertical reciprocation above and in axial alignment with the outlet, shears acting in timed relation with the reciprocations of the plunger to sever glass suspended from the outlet, and means for imparting within a selected cycle irregular rotational movement to the plunger whereby for successive charges in each cycle the character of the mixing of the glass of differing colors is varied.

8. Apparatus for feeding mold charges composed of glass of different colors, which comprises a container for the glass having a submerged outlet, a plurality of sources of glass supply, means for conveying the glass of each supply to a common point above the outlet in the container, a plunger mounted for vertical reciprocation above and in axial alignment with the outlet, shears acting in timed relation with the reciprocations of the plunger to sever glass suspended from the outlet, and means comprising a rack and pinion and a cam for imparting to the plunger during a selected cycle, rotational movement of varying characteristics, whereby the coloring of the glass of successive charges during each cycle may be varied.

9. The method of feeding molten glass in mold charges which comprises bringing a plurality of streams of glass of different colors initially together at the upper end of a downwardly opening discharge passage, twisting the several streams together as they pass into said discharge passage to produce streaks of different colors in the glass of the combined streams, and severing the mold charges from the glass issuing from the discharge passage.

Signed at Hartford, Connecticut, this 14th day of October, 1927.

EVERETT O. HILLER.